(12) United States Patent
Aoyama et al.

(10) Patent No.: US 6,873,291 B2
(45) Date of Patent: Mar. 29, 2005

(54) SURFACE-MOUNTED ANTENNA AND COMMUNICATIONS APPARATUS COMPRISING SAME

(75) Inventors: Hiroyuki Aoyama, Saitama-ken (JP); Keiko Kikuchi, Saitama-ken (JP); Yasunori Takaki, Saitama-ken (JP); Hidetoshi Hagiwara, Tottori-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/170,585

(22) Filed: Jun. 14, 2002

(65) Prior Publication Data

US 2003/0006936 A1 Jan. 9, 2003

(30) Foreign Application Priority Data

Jun. 15, 2001 (JP) .......................................... 2001-181549
Dec. 25, 2001 (JP) .......................................... 2001-391739

(51) Int. Cl.⁷ .................................................. H01Q 1/24
(52) U.S. Cl. ................................. 343/700 MS; 343/702
(58) Field of Search .......................... 343/700 MS, 702, 343/846, 829

(56) References Cited

U.S. PATENT DOCUMENTS 5,696,517 A  * 12/1997  Kawahata et al. ... 343/700 MS
5,867,126 A     2/1999  Kawahata et al.
6,147,650 A  * 11/2000  Kawahata et al. ... 343/700 MS
6,300,909 B1 * 10/2001  Tsubaki et al. ...... 343/700 MS
6,320,545 B1    11/2001  Nagumo et al.
6,323,811 B1    11/2001  Tsubaki et al.

6,448,932 B1 *  9/2002  Stoiljkovic et al. ... 343/700 MS

FOREIGN PATENT DOCUMENTS

DE  100 30 402      2/2001
JP  11-340726       12/1999
WO  WO 01 24316 A   4/2001

OTHER PUBLICATIONS

European Search Report for EP 02 01 3156 completed Feb. 18, 2004.
Patent Abstracts of Japan vol. 2000, No. 13, Feb. 5, 2001 –& JP 2000 286615 A (NGK Insulators Ltd), Oct. 13, 2000 *abstract; figures 1,10*.

* cited by examiner

*Primary Examiner*—Tho Phan
(74) *Attorney, Agent, or Firm*—Sughrue Mion, PLLC

(57) ABSTRACT

A surface-mounted antenna comprising a substrate made of a high-dielectric constant material having a dielectric constant $\in_r$ of 6 or more, a ribbon-shaped radiation electrode having one end which is grounded and the other end which is open, a grounding electrode connected or capacitance-coupled to one end of the radiation electrode, and a current-feeding electrode in a portal shape formed on a side surface separate from the radiation electrode with a gap; the current-feeding electrode having a current-feeding portion at one end, a grounding portion at the other end, and a portion substantially in alignment with the radiation electrode between them; and the length of the aligning portion, a gap width or a portal shape being able to be properly set such that capacitance owned by the current-feeding electrode and inductance can be adjusted for easily achieving impedance matching.

17 Claims, 11 Drawing Sheets

Fig. 20(a)
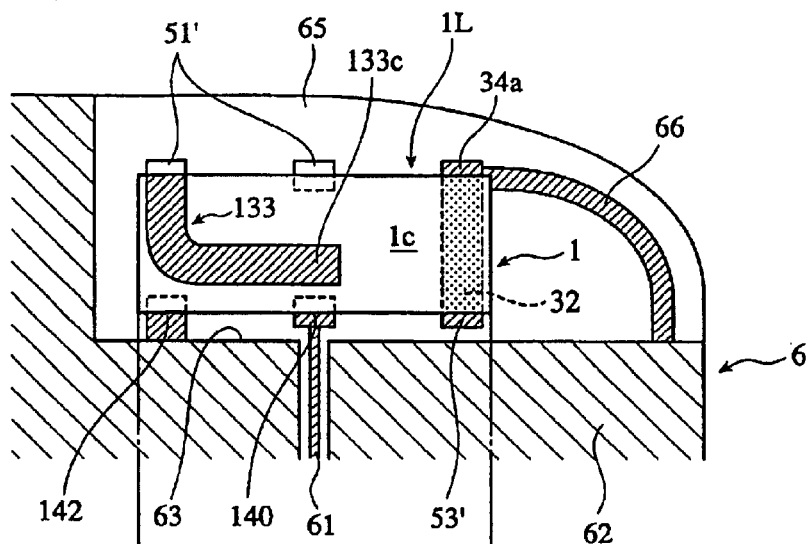
Fig. 20(b)
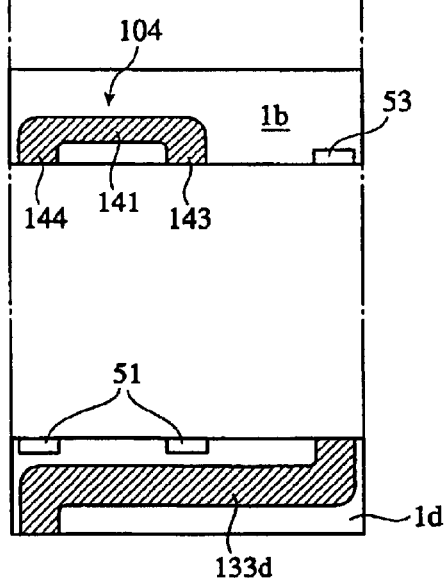
Fig. 20(c)

SURFACE-MOUNTED ANTENNA AND COMMUNICATIONS APPARATUS COMPRISING SAME

FIELD OF THE INVENTION

The present invention relates to a small antenna comprising a substrate made of dielectric or magnetic materials such as ceramics, resins, etc., particularly to a surface-mounted antenna having an impedance-matching function in its current-feeding electrode, and a communications apparatus comprising such a surface-mounted antenna.

BACKGROUND OF THE INVENTION

Surface-mounted antennas are used for global positioning systems (GPS), local area networks (wireless LAN), etc. with carrier waves in a GHz band. The miniaturization of mobile gears proceed at a dramatic speed, and the surface-mounted antennas are required to be small with reduced height, have good radiation efficiency without directionality, and further be operable in a wide band. However, because conventional surface-mounted antennas have characteristics, which are deteriorated with miniaturization and reduction in height, they are not necessarily satisfactory in achieving sufficient miniaturization and reduction in height.

In general, this type of an antenna is designed to have a radiation electrode whose length corresponds to ¼ of wavelength. This is due to the fact that the antenna exhibits the maximum radiation efficiency at ¼ wavelength, and this requirement is particularly important for mobile gears, which should be able to be operated for as long a period of time as possible by one charge of a battery. It is known that when a radiation electrode is arranged on a dielectric substrate, its effective length is inversely proportional to the square root of a dielectric constant $\in_r$, which is called a wavelength-reducing effect. With the wavelength-reducing effect, the radiation electrode of the antenna can be made shorter, resulting in the miniaturization and reduction in height of the antenna.

The lower the propagation frequency of the antenna, the smaller the antenna can be made by using a material of a large dielectric constant for the substrate. However, there is actually a limit in the use of high-dielectric constant materials, and only dielectric substrates having dielectric constants $\in_r$ of up to about 4 have been put into practical use, because a higher dielectric constant $\in_r$ than the above level causes the problem of impedance matching. Because input impedance at a current-feeding point is likely to change largely in a surface-mounted antenna having a high dielectric constant, it has become difficult to overcome the problem of impedance matching as the miniaturization.

For instance, as shown in FIG. 21, a surface-mounted antenna described in U.S. Pat. No. 5,867,126 comprises a radiation electrode 92 formed on an upper surface 91 of a substantially rectangular substrate 90 and bent in a substantially L or rectangular U shape, with one end open and the other end grounded, and a current-feeding electrode 94 formed on the upper surface of the substrate 90 with a gap 96 to excite the radiation electrode 92, one end of the current-feeding electrode 94 being connected to a current-feeding wire 99. As shown in FIG. 22, its equivalent circuit is a parallel resonance circuit comprising radiation resistance R and inductance L of the radiation electrode 92, capacitance C formed between the radiation electrode 92 and a ground conductor, and capacitance Ci' formed between the radiation electrode 92 and the current-feeding electrode 94.

In this antenna, high-frequency electric power from a transmission circuit (not shown) is transmitted to the current-feeding electrode 94 via a current-feeding wire 99 on a circuit board, input to a resonance circuit constituted by the radiation electrode 92 and the ground conductor for parallel resonation, and radiated from the radiation electrode 92 as electromagnetic waves. In order that there is no voltage reflection at a current-feeding point 98, impedance matching should be taken.

Various proposals have been made as impedance-matching means for making the input impedance of the current-feeding electrode 94 viewed from the transmission circuit, namely input impedance at the current-feeding point 98, equal to characteristics impedance of 50 Ω. For instance, in the antenna shown in FIG. 21, the radiation electrode 92 is capacitance-coupled to the current-feeding electrode 94, and capacitance Ci' is set between the radiation electrode 92 and the current-feeding electrode 94 such that the inductance of the radiation electrode 92 is cancelled as shown in the equivalent circuit of FIG. 22.

However, in the conventional antenna shown in FIG. 21, the current-feeding electrode and the radiation electrode are not directly connected but only capacitance-coupled, without using inductance for impedance matching. Accordingly, if this antenna is made smaller and reduced in height, it cannot have high characteristics easy for impedance matching. In addition, omni-directionality is essentially needed in antennas for GPS, wireless LAN, etc., and improvement in radiation efficiency and gain and the expansion of bandwidth are also needed. These points conventionally have not been fully considered.

When there is impedance mismatching, a new matching circuit is sometimes inserted between a transmission/reception circuit and the antenna. However, the addition of a new matching circuit makes the antenna apparatus larger. With respect to an impedance-matching circuit, JP 2000-286615 A discloses a small antenna comprising a substrate of a laminate structure, and a matching circuit formed between laminate layers. However, this antenna not only has a structure complicated, but also suffers from increase in production cost.

U.S. Pat. No. 6,323,811 discloses an antenna comprising a first radiation electrode (radiation electrode on the side of current feeding) and a second radiation electrode (radiation electrode on the side of no current feeding) on an upper surface of a substrate, in a composite resonance state between the two radiation electrodes, and further comprising an electrode for a matching circuit on a side surface of the substrate. In this antenna, the first radiation electrode (radiation electrode on the side of current feeding) is directly connected to the matching electrode at an impedance matching position, but a current-feeding electrode does not have capacitance. Impedance matching is thus achieved by adjusting only the inductance. The electrode structure having such a matching circuit corresponds to a conventional reverse F antenna, an antenna structure inherently easy for impedance matching.

JP 8-186431 A and JP 11-340726 A disclose impedance matching technologies in a unidirectional antenna having a structure comprising a radiation conductor on an upper surface of a substrate, and a grounding conductor formed on the entire bottom surface of the substrate. However, such antenna is not suitable for applications requiring omni-directionality, such as GPS, wireless LAN, etc. This is clear, for instance, from the fact that this antenna has a structure in which a current-feeding conductor formed on an upper surface of a substrate is surrounded by a radiation conductor, resulting in large capacitance coupling. In addition, because no attention is paid to miniaturization, radiation efficiency, gain and bandwidth, there are problems to be solved to use it for GPS, etc.

OBJECTS OF THE INVENTION

Accordingly, an object of the present invention is to provide a surface-mounted antenna whose impedance matching can easily be achieved even when a material having a relatively high dielectric constant is used for miniaturization, which has high gain, wide band and omni-directionality, particularly suitable for GPS, wireless LAN, etc.

Another object of the present invention is to provide a communications apparatus comprising this surface-mounted antenna for cell phones, headphones, personal computers, notebook personal computers, digital cameras, etc.

DISCLOSURE OF THE INVENTION

As a result of intense research in view of the above objects, the inventors have found that with an impedance-matching function provided by a current-feeding electrode structure having not only capacitance but also inductance, impedance matching can easily be achieved even when a material having a relatively high dielectric constant is used for the substrate, resulting in a small surface-mounted antenna with omni-directionality. The present invention is based on this finding.

The first surface-mounted antenna of the present invention comprises a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap; said current-feeding electrode having a current-feeding point at one end and a grounding point at the other end, as well as a portion for achieving impedance matching by capacitance and inductance between said current-feeding point and said grounding point; and an area ratio of said grounding electrode in a bottom surface of said substrate being 30% or less.

The second surface-mounted antenna of the present invention comprises a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap; said current-feeding electrode being in a portal shape having a current-feeding portion at one end and a grounding portion at the other end, as well as a portion in alignment with said radiation electrode via a gap between them.

The third surface-mounted antenna of the present invention comprises a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap; said current-feeding electrode being constituted by two L-shaped electrodes formed on the opposing side surfaces of said substrate, which are connected via one I-shaped electrode formed on an end surface of said substrate; one L-shaped electrode having a current-feeding portion at one end; the other L-shaped electrode having a grounding portion at one end; and said I-shaped electrode being a portion in alignment with said radiation electrode, whereby said current-feeding electrode is in a portal shape.

In the present invention, said current-feeding electrode is preferably constituted by first and second electrodes formed on the opposing side surfaces of said substrate, which is connected via one I-shaped electrode formed on an end surface of said substrate; the first electrode having a current-feeding portion at one end, the second electrode having a grounding portion at one end, and said I-shaped electrode being said aligning portion, so that said current-feeding electrode is in a portal shape; and said radiation electrode having a grounding electrode portion formed on an end surface, or on an end surface and opposing side surfaces, of said substrate.

At least part of said current-feeding electrode and said radiation electrode is preferably in a shape of a meander, rectangular U, L or a crank.

Said current-feeding electrode is formed on a side surface of said substrate such that it faces an open tip end of said radiation electrode with a gap. In this case, said current-feeding electrode has a current-feeding portion positioned near an open tip end of said radiation electrode.

In a preferred embodiment of the present invention, at least part of said radiation electrode extends from one end of said substrate toward the other end thereof in a longitudinal direction with its width narrowing substantially continuously and/or stepwise. In another preferred embodiment of the present invention, said radiation electrode extends from one end of said substrate toward the other end thereof in a longitudinal direction with its width narrowing substantially continuously and/or stepwise, and is bent in a substantially rectangular U shape at the other end.

In a further preferred embodiment of the present invention, said radiation electrode extends to an upper surface through a side surface different from a side surface on which said current-feeding electrode is formed. In this case, the bottom surface of said substrate preferably has substantially no grounding electrode in an area under said radiation electrode formed on an upper surface of said substrate.

Said radiation electrode and/or said current-feeding electrode preferably has round corners.

The antenna of the present invention may further comprise a second grounding electrode opposing the other end of said radiation electrode via a gap.

In a particularly preferred embodiment of the present invention, the surface-mounted antenna comprises a substrate made of a dielectric or magnetic material, a ribbon-shaped radiation electrode formed on said substrate, a grounding electrode formed on said substrate such that said grounding electrode is directly connected or capacitance-coupled to one end of said radiation electrode, and a current-feeding electrode formed on at least a side surface of said substrate separate from said radiation electrode with a desired gap; said radiation electrode being in a portal shape as a whole comprising an electrode portion formed on one side surface of said substrate in a longitudinal direction, which is connected to an L-shaped electrode portion formed on an upper surface of said substrate; said current-feeding electrode comprising a current-feeding portion and a grounding portion each extending substantially vertically on the other side surface of said substrate, and an aligned portion extending between said current-feeding portion and said grounding portion substantially in parallel with said radiation electrode via said gap; an area ratio of said grounding electrode in a bottom surface of said substrate being 30% or less; and the shape and positional relation of said current-feeding electrode and said radiation electrode being modified to adjust capacitance and inductance for impedance matching.

Said current-feeding portion of said current-feeding electrode is preferably positioned near an open tip end of said radiation electrode, while said grounding portion of said current-feeding electrode is preferably positioned near a substrate end on the opposite side to said grounding electrode.

The antenna substrate of the present invention is preferably made of a dielectric material having a dielectric constant $\in_r$ of 6–50.

The communications apparatus of the present invention comprises an antenna apparatus in which the above surface-mounted antenna is mounted onto an area of a circuit board free from a ground conductor, said substrate having said radiation electrode extending in a longitudinal direction being aligned with an edge of said ground conductor of said circuit board via a gap; and said current-feeding electrode being formed on the side of said ground conductor.

In a further preferred embodiment of the present invention, said grounding electrode formed on said surface-mounted antenna on the opposite side of said ground conductor of said circuit board is arranged near a corner of said circuit board, and said grounding electrode is connected to a conductor of said circuit board by a linear conductor.

BRIEF DESCRIPTION OF THE DRAWINGS

FIG. 20(a) is a plan view showing another example in which the antenna of the present invention is mounted onto a circuit board;

FIG. 20(b) is a side view showing a current-feeding electrode in the antenna of FIG. 20(a);

FIG. 20(c) is a side view showing a radiation electrode in the antenna of FIG. 20(a);

DESCRIPTION OF THE PREFERRED EMBODIMENTS

[1] Impedance Matching

When a radiation electrode, a grounding electrode and a current-feeding electrode, etc. are formed on a substrate, there arises capacitance between these electrodes. Increase in capacitance between the current-feeding electrode and the radiation electrode results in decrease in input impedance, causing impedance mismatching. Because capacitance increases in proportion to a dielectric constant $\in_r$, the impedance mismatching becomes remarkable when a high-dielectric constant material is used to lower a propagation frequency. Accordingly, low-dielectric substrates having a dielectric constant $\in_r$ of at most about 4 have conventionally been used. The present invention makes it possible to use dielectric materials having a dielectric constant $\in_r$ of 6 or more, preferably 8 or more, particularly 20–50 or more, though not restrictive.

Figure 2:
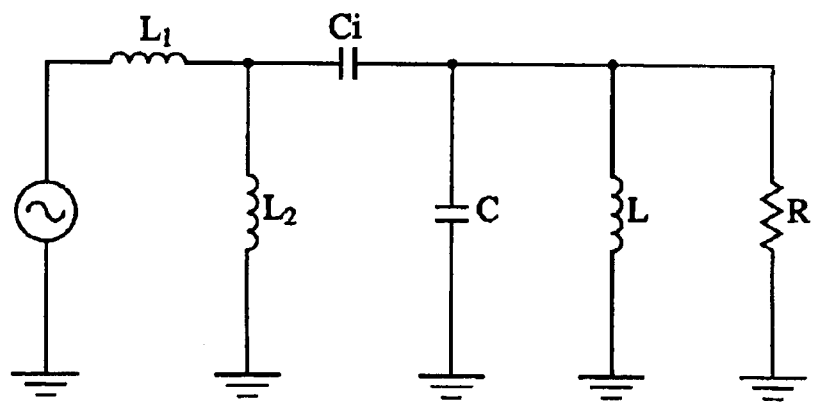
FIG. 2 is a view showing an equivalent circuit of the antenna in the first embodiment.

The present invention is based on the technology that even if the use of a high-dielectric constant material for a substrate leads to increase in capacitance between the radiation electrode and the current-feeding electrode, such increase in the capacitance can be cancelled by elongating the current-feeding electrode to increase its inductance, thereby achieving impedance matching. Though this type of a conventional antenna has a current-feeding electrode having a structure providing only capacitance in its equivalent circuit, the present invention provides the current-feeding electrode with a shape capable of providing capacitance and inductance. Specifically, the current-feeding electrode is formed in a ribbon shape to make it easy to obtain inductance, and part of the current-feeding electrode is in alignment with a radiation electrode via a gap, so that capacitance can be adjusted. Also, with the ribbon-shaped current-feeding electrode having a current-feeding portion at one end and a grounding portion at the other end, as shown in FIG. 2, parallel component $L_2$ and series component $L_1$, $C_i$ are provided, making it easy to design impedance matching, thereby making a developing period shorter.

Because the surface-mounted antenna may be in various shapes depending on its use, impedance matching conditions should be widely adapted to meet these conditions. As described above, the current-feeding electrode of the present invention may be regarded as a combination of a parallel component $L_2$ and series components $L_1$, $C_i$. With this current-feeding electrode formed in a shape of a meander, rectangular U, L or a crank or a combination thereof, inductance and capacitance can be arbitrarily set without being restricted by the impedance matching conditions. For instance, capacitance and inductance may be substantially the same, or either one of them may be larger. Inductance is in proportion to the length of the current-feeding electrode, and capacitance is a function of the opposing length of the current-feeding electrode and the radiation electrode. Accordingly, when impedance matching is carried out with the current-feeding electrode of the present invention, it is first determined which should be increased or decreased to what extent among $L_1$, $L_2$ and $C_i$ in the equivalent circuit. Next, utilizing the fact that $L_1$ and $L_2$ are in proportion to the length of the current-feeding electrode, and that $C_i$ is a function of the opposing length of the current-feeding electrode and the radiation electrode, the shape of the current-feeding electrode meeting parameters desired for impedance matching can easy be determined.

[2] Radiation Electrode and Current-feeding Electrode

In the antenna structure according to one embodiment of the present invention, the radiation electrode is formed on at least an upper surface of the substrate, with one end grounded and the other end being an open tip end. Though this antenna structure seems to be close to a reverse F-shaped antenna in which a current-feeding electrode is connected to a radiation electrode near a grounding end thereof, the antenna structure of the present invention fundamentally differs from the reverse F-shaped structure, in that the radiation electrode is capacitance-coupled to the current-feeding electrode in the present invention, because they are separate from each other. The current-feeding electrode is preferably formed on one side surface of the substrate, because there is no misalignment when the electrode is printed, thereby making it easy to form the electrode with stable characteristics.

With distance and alignment length between the radiation electrode and the current-feeding electrode and/or the length and shape of legs of the current-feeding electrode properly set in the present invention, impedance matching is easily achieved. This makes it possible to arbitrarily select a bandwidth BW. Because there are relations of BW $\propto$ 1/Q and Q=R×(C/L)½, the control of C or C/L based on the degree of capacitance coupling and the length of an electrode can make the bandwidth BW wider. For instance, when the current-feeding electrode has a current-feeding portion positioned near the open tip end of the radiation electrode, a radiation end portion may be regarded as an inductor, making it possible to have large inductance L. In a design of the same resonance frequency, capacitance C can be made smaller according to increase in inductance, resulting in a higher Q value and thus increasing a bandwidth.

[3] Grounding Electrode

The surface-mounted antenna of the present invention is characterized by having substantially no grounding electrode on a bottom surface for the purpose of excellent omni-directionality. When the grounding electrode is formed on the entire bottom surface, the antenna loses omni-directionality because of capacitance coupling to the radiation electrode on an upper surface. Specifically, a ratio of the total area of the grounding electrode on the bottom surface/the total area of the bottom surface is preferably 30% or less, more preferably 20% or less. It is also preferable that there is substantially no grounding electrode in an area of the bottom surface under the radiation electrode formed on the upper surface.

A second grounding electrode may be arranged in opposite to an open tip end of the radiation electrode via a gap. In this case, because of strong capacitance coupling to the opposing grounding electrode, the arrangement of a current-feeding electrode nearby causes relatively small influence. Accordingly, to largely adjust a propagation frequency, the main adjusting of frequency can be achieved by changing the degree of coupling between the radiation electrode and the second grounding electrode, and the fine adjusting of frequency can be achieved by changing the degree of coupling between the radiation electrode and the current-feeding electrode.

[4] Upper Limit of Dielectric Constant

In the present invention, the dielectric constant $\in_r$ of the substrate is preferably in a range of 6–50. This dielectric constant $\in_r$ is determined by taking into account the temperature coefficient of a dielectric material, the working precision of the substrate, etc., and improvement in the quality of a material, working precision, etc. would of course result in increase in its upper limit. The substrate having such a dielectric constant $\in_r$ may be a dielectric ceramic formed, for instance, by sintering a material comprising 22.22 weight % of MgO, 5.13 weight % of $CaCO_3$, 48.14 weight % of $TiO_2$ and 24.51 weight % of ZnO. This dielectric ceramic, which has a dielectric constant $\in_r$ of 21, comprises 36.6 mole % of MgO, 3.4 mole % of CaO, 40.0 mole % of $TiO_2$ and 20.0 mole % of ZnO.

When the substrate made of a high-dielectric material is used, the radiation efficiency of the radiation electrode decreases. To suppress the decrease in a radiation efficiency, the radiation electrode and the grounding electrode are constituted to increase radiation to free space, or a composite substrate of a high-dielectric material and a low-dielectric material is used.

[5] Specific Examples of Surface-mounted Antennas

Figure 1:
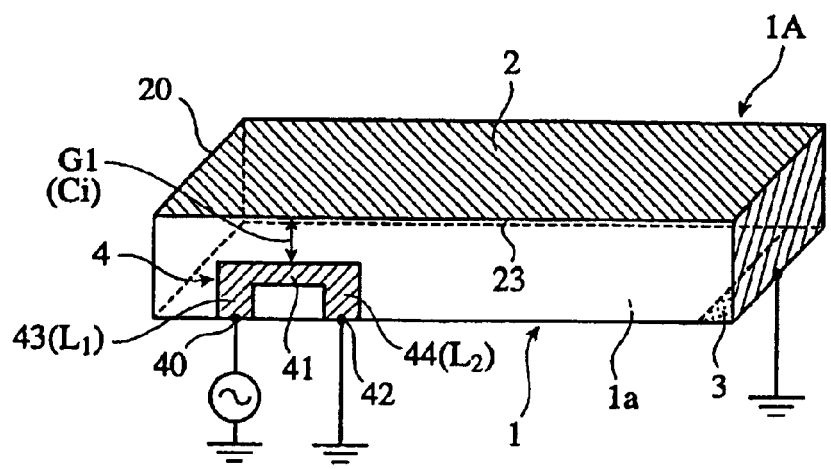
FIG. 1 is a perspective view showing a surface-mounted antenna according to the first embodiment of the present invention.

FIG. 1 is a perspective view showing a surface-mounted antenna according to the first embodiment of the present invention. This antenna 1A comprises a radiation electrode 2 formed on an upper surface of a rectangular substrate 1, a grounding electrode 3 connected to one end of the radiation electrode 2, and a current-feeding electrode 4 formed on a side surface separate from the radiation electrode 2 with a predetermined gap G1. The other end of the radiation electrode 2 is an open tip end 20. Though the antenna 1A has a structure similar to the reverse F antenna, it is different from the reverse F antenna in that the current-feeding electrode 4 faces the radiation electrode 2 with a gap G1. There is no electrode other than soldering electrodes on a bottom surface 1a of the substrate 1, and the antenna 1A is mounted onto an area of a circuit board free from a ground conductor. Accordingly, the antenna 1A exhibits omni-directionality with a radiating electric field pattern, which is substantially uniform in any direction.

The current-feeding electrode 4 is a ribbon-shaped electrode bent at two points in a portal shape having a portion 41 opposing the radiation electrode 2 substantially in alignment with its edge 23. The current-feeding electrode 4 has a current-feeding portion 43 at one end, whose current-feeding point 40 is connected to a current-feeding wire of a transmission/reception circuit (not shown), and a grounding portion 44 at the other end, whose a grounding end 42 is connected to a ground conductor. The current-feeding portion 43 and the grounding portion 44 of the current-feeding electrode 4 mainly generate inductance, while the radiation electrode 2 and the aligned portion 41 mainly generate capacitance. Accordingly, the surface-mounted antenna of the present invention has an equivalent circuit shown in FIG. 2.

The inductance $L_1$, $L_2$ is generated by leg portions 43, 44 of the current-feeding electrode 4, while the capacitance $C_i$ is generated between the radiation electrode 2 and the aligned portion 41 of the current-feeding electrode 4. Accordingly, with the length and shape of the leg portion 43, 44 and the aligned portion 41 properly modified to change $L_1$, $L_2$ and $C_i$, input impedance $Z_{in}$ when viewing the radiation electrode 2 from the current-feeding point 40 can be made equal to 50 Ω. It is thus an important feature of the present invention that input impedance matching can be independently carried out not only by changing capacitance between the radiation electrode 2 and the current-feeding electrode 4, but also by changing the inductance of the current-feeding electrode 4. It should be noted that the positions of the current-feeding point 40 and the grounding point 42 may be reversed laterally, and this is true in the subsequent embodiments. The aligned portion 41 need only be aligned with the radiation electrode 2 via a gap, and they need not be in parallel.

Figure 3:
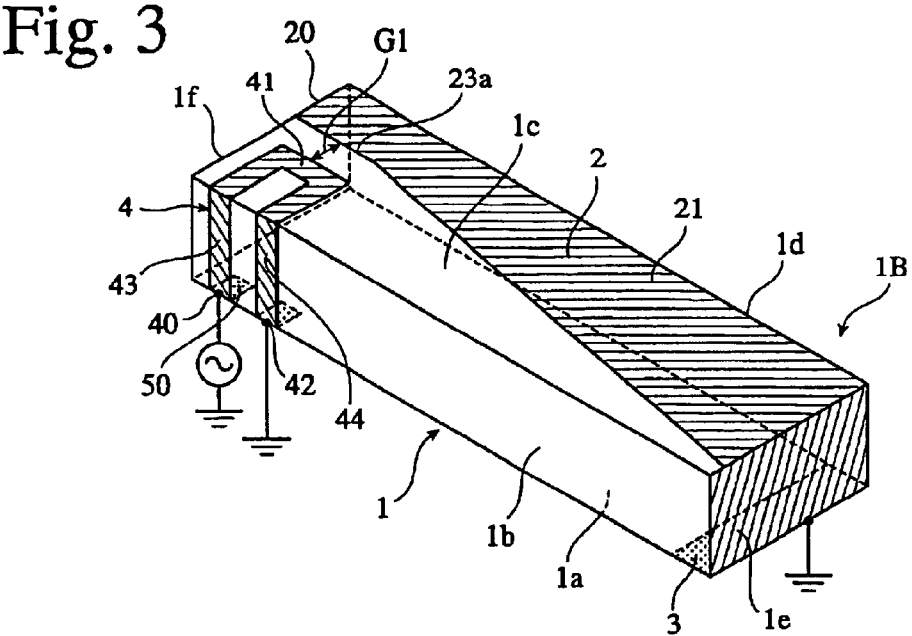
FIG. 3 is a perspective view showing a surface-mounted antenna according to the second embodiment of the present invention.
Figure 4:
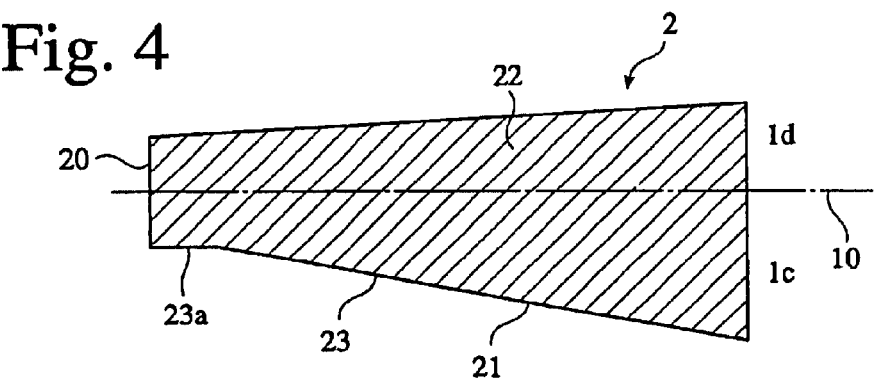
FIG. 4 is a development of the radiation electrode shown in FIG. 3.
Figure 5:
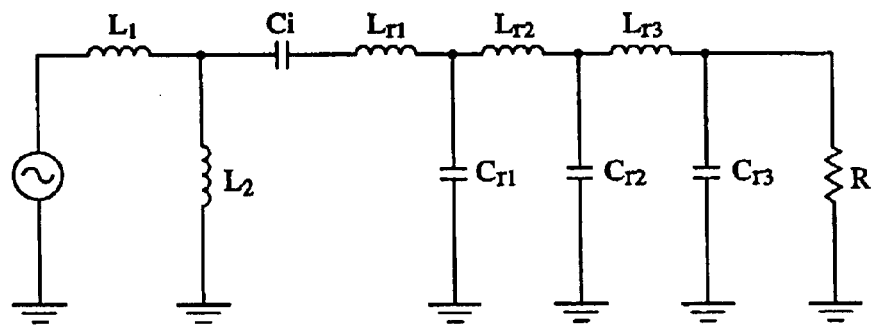
FIG. 5 is a view showing an equivalent circuit of the antenna in the second embodiment.

FIG. 3 is a perspective view showing a surface-mounted antenna according to the second embodiment, FIG. 4 is a development of its radiation electrode, and FIG. 5 is a view showing an equivalent circuit of this antenna.

The surface-mounted antenna 1B in this embodiment is for GPS, comprising a rectangular substrate 1, a radiation electrode 2 formed on an upper surface 1c and an adjacent side surface 1d, a grounding electrode 3 connected to one end of the radiation electrode 2, and a current-feeding electrode 4 formed on the substrate 1 in a portal shape extending from a side surface 1b to an upper surface 1c in a longitudinal direction. The current-feeding electrode 4 may be formed only on the side surface 1b. The arrangement and shape of the portal current-feeding electrode 4 may be determined by taking into consideration a balance of impedance matching and increase in bandwidth.

The radiation electrode 2 in this embodiment has a shape extending from one end of the substrate 1 in a longitudinal direction with its width narrowing substantially continuously and/or stepwise. As shown in the development of FIG. 4, the radiation electrode 2 is constituted by a radiation electrode portion 21 formed on an upper surface 1c of the substrate 1, and a radiation electrode portion 22 formed continuously on an adjacent side surface 1d, and the radiation electrode portion 22 also has a width slightly decreasing toward a tip end. It is thus possible to induce multi-resonance by forming the radiation electrode 2 such that its width decreases gradually not only on the upper surface 1c of the substrate 1 but also on the adjacent side surface 1d thereof, thereby making the antenna smaller and more omni-directional.

The grounding electrode 3 may be connected to the radiation electrode 2 by non-contact capacitance coupling. The grounding electrode 3 may be formed on four surfaces surrounding one end surface 1e of the substrate 1. The grounding electrode 3 formed on the bottom surface 1a also acts as a soldering electrode, which is connected to a ground conductor on the circuit board. The current-feeding electrode 4, too, has a grounding electrode portion 50 on a bottom surface 1a of the substrate 1, which acts as an electrode soldered to the circuit board.

Figure 6A:
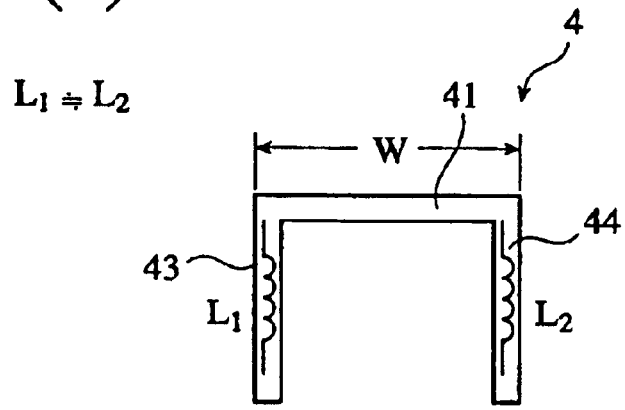
FIGS. 6(a)–6(c) are views showing other examples of the current-feeding electrode used in the present invention.
Figure 6B:
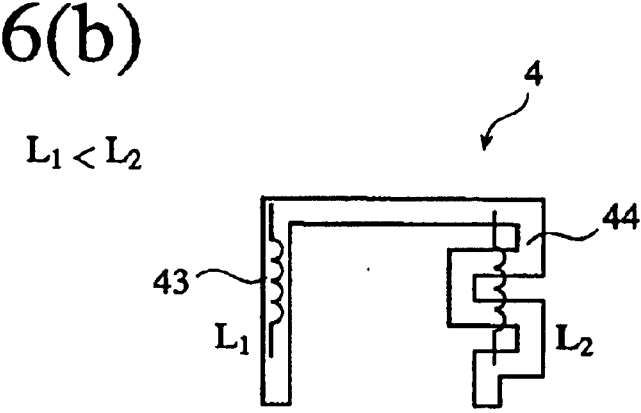
Figure 6C:
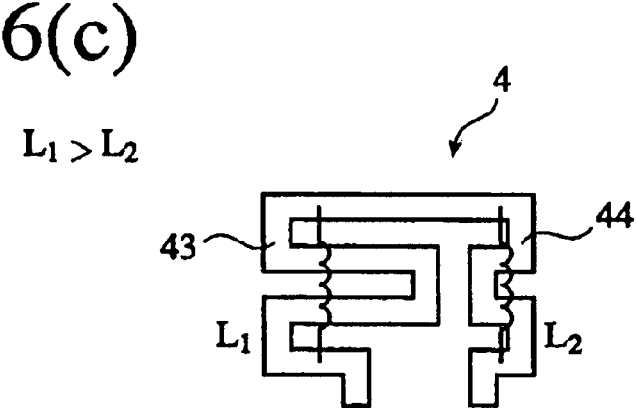

In this embodiment, current-feeding electrode 4 is in a portal (rectangular U) shape having a width of 1 mm and an equivalent length of 10 mm. FIGS. 6(a)–(c) show various shapes of the current-feeding electrode 4. FIG. 6(a) shows an example of the rectangular U-shaped, current-feeding electrode 4 with substantially equal inductance $L_1$, $L_2$ generated in their lateral leg portions. FIG. 6(b) and (c) show the shapes of lateral leg portions having different lengths, examples in which inductance is adjusted by the length of the conductor. In FIG. 6(b), a leg portion on the right side is in a meandering shape, with $L_1 < L_2$. Also in FIG. 6(c), a left leg portion is in a crank shape, while a right leg portion is in a meandering shape, with $L_1 > L_2$. When adjusting by inductance, $L_1$ is increased to increase input impedance, while $L_2$ is increased to decrease input impedance.

The aligned center portion 41 of the current-feeding electrode 4 is one of the features of the present invention. C and $C_i$ can arbitrarily be adjusted by the aligned center portion 41. That is, capacitance $C_i$ is substantially proportional to the length W of the aligned portion 41, and inversely proportional to a distance $G_1$ between the aligned portion 41 and the radiation electrode 2. Accordingly, when $C_i$ is increased, the aligned portion 41 is made longer, or the distance $G_1$ between the aligned portion 41 and the radiation electrode 2 is decreased. Alternatively, when $C_i$ is decreased, the opposite measure is taken. $C_i$ can thus be adjusted by changing the length W of the aligned portion 41 and the distance $G_1$ between the aligned portion 41 and the radiation electrode 2.

This embodiment is also characterized by the radiation electrode 2. The basic shape of the radiation electrode 2 is such that its length in a direction perpendicular to the flow of high-frequency current (longitudinal direction of the substrate 1), namely its width is not constant, but the width gradually decreases as it nears an open tip end 20. High-frequency current supplied from a feed source to the current-feeding electrode 4 is resonated at a frequency determined by the inductance of the radiation electrode 2 and capacitance generated between the radiation electrode 2 and a ground, and radiated to space as an electromagnetic energy. In this case, there is a current distribution mode whose node and loop are at the grounding electrode 3 and the open tip end 20. When the radiation electrode 2 has a constant width, there is only one current distribution mode. On the other hand, when the radiation electrode 2 does not have a constant width, a resonance circuit having a plurality of inductances $Lr_1$, $Lr_2$, $Lr_3$, . . . and capacitances $Cr_1$, $Cr_2$, $Cr_3$, . . . as shown in FIG. 5 is equivalently formed in the antenna. Because these resonance circuits have considerably close resonance frequencies, there are equivalently a plurality of continuously changing resonance, resulting in wideband resonance characteristics.

Figure 7:
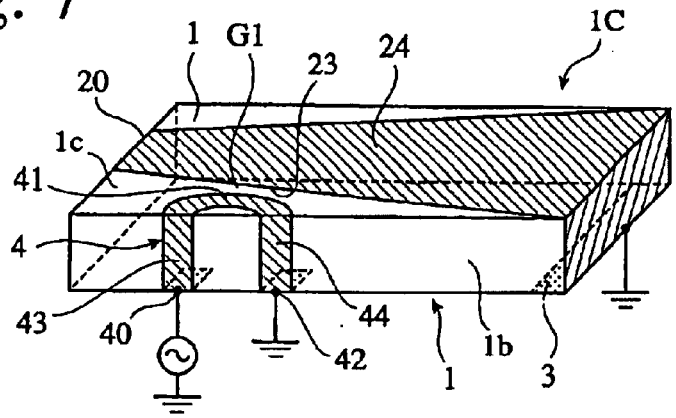
FIG. 7 is a perspective view showing a surface-mounted antenna according to the third embodiment of the present invention.

FIG. 7 shows a surface-mounted antenna according to the third embodiment of the present invention. The same symbols and reference numerals are assigned to the same portions as in the above embodiments, and thus their explanation will be omitted. As in the above embodiments, a radiation electrode 24 has substantially trapezoidal shape extending from one end of the substrate 1 to the other end in a longitudinal direction with its width narrowing substantially continuously and/or stepwise, and a current-feeding electrode 4 is formed on the substrate 1, extending from a side surface 1b to an upper surface 1c. In this embodiment, because the current-feeding electrode 4 is in a U shape, a gap between the aligned portion 41 and the radiation electrode 24 is not constant, with relatively small capacitance. Such radiation electrode 24 and current-feeding electrode 4 need not be in parallel, but they need only be partially aligned.

Figure 8:
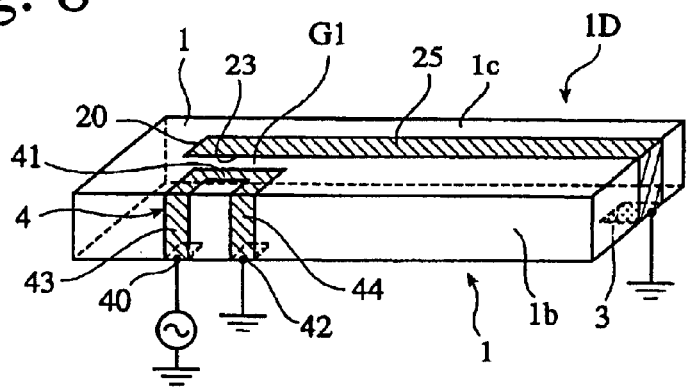
FIG. 8 is a perspective view showing a surface-mounted antenna according to the fourth embodiment of the present invention.

FIG. 8 shows a surface-mounted antenna according to the fourth embodiment of the present invention. The same symbols and reference numerals are assigned to the same portions as in the above embodiments, and thus their explanation will be omitted. The radiation electrode 25 is in a microstrip-line shape, whose one end is grounded and whose other end 20 is open. Though a radiation electrode 2 is formed along the entire length of the dielectric substrate 1 and an upper surface 1c thereof in any of the above embodiments, the length of the radiation electrode may be set at ¼ of a wavelength at a desired frequency, not necessarily equal to the entire length of the substrate 1. In this embodiment, the radiation electrode 25 is shorter than the substrate 1, making it possible to have an adjustment margin for lowering a center frequency of a propagation signal. Also, even if there are size irregularities, cracks, etc. in the edges of the substrate 1, they would not pose any problem to the formation of the radiation electrode 25.

Figure 9:
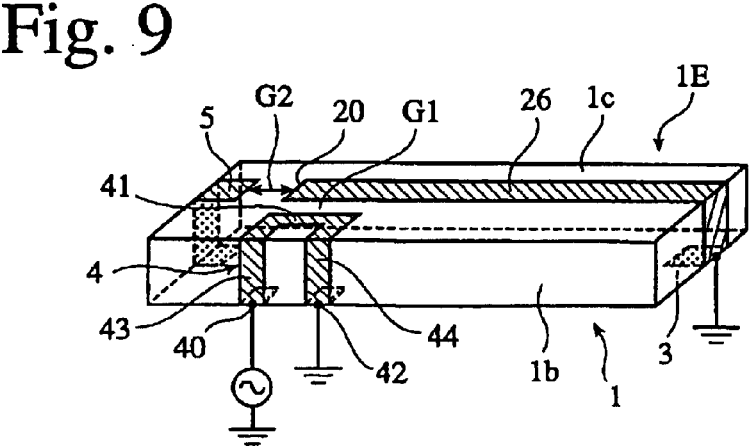
FIG. 9 is a perspective view showing a surface-mounted antenna according to the fifth embodiment of the present invention.

FIG. 9 shows a surface-mounted antenna according to the fifth embodiment of the present invention. The same symbols and reference numerals are assigned to the same portions as in the above embodiments, and thus their explanation will be omitted. A second grounding electrode 5 is formed on the substrate 1, such that it opposes an open tip end 20 of a radiation electrode 26 via a gap G2. This makes it possible to provide large, stable capacitance between the open tip end 20 of the radiation electrode 26 and a ground conductor, thereby largely adjusting a frequency. Fine adjustment may be carried out by the inductance and capacitance of the current-feeding electrode 4.

According to capacitance provided by a gap G2 between an open tip end 20 of the radiation electrode 26 and the second grounding electrode 5, the desired frequency can be obtained even though the radiation electrode 26 is short, providing small inductance. Accordingly, the surface-mounted antenna having such structure is suitable for miniaturization.

Though the current-feeding electrode 4 is formed on the substrate 1 from a side surface 1b to an upper surface 1c, it may be formed only on the side surface 1b depending on conditions. This is true in any of the above embodiments. When the current-feeding electrode 4 is formed only on the side surface 1b, there is no need to pay attention to the precision of seam, etc. in the formation of the current-feeding electrode 4 by screen printing, etc., resulting in decrease in the number of steps, that is preferable from the viewpoint of production.

Figure 10A:
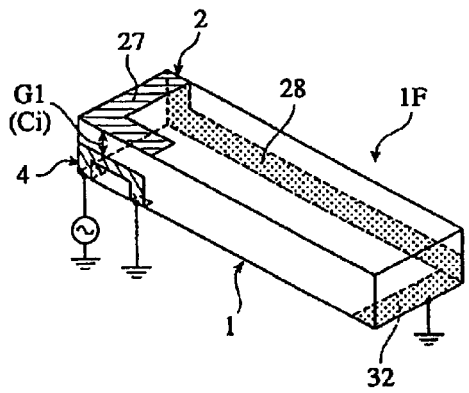
FIG. 10(a) is a perspective view showing a surface-mounted antenna according to the sixth embodiment of the present invention.
Figure 10B:
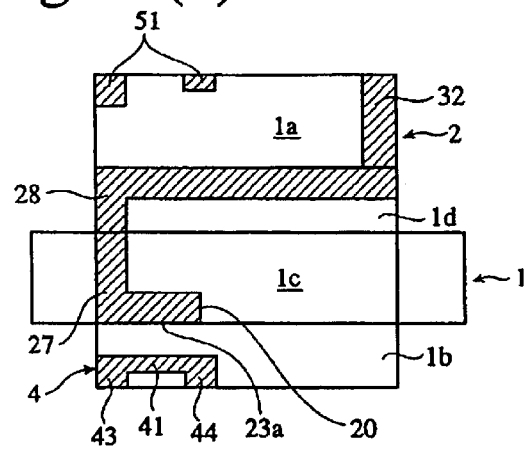
FIG. 10(b) is a development showing a surface-mounted antenna according to the sixth embodiment of the present invention.
Figure 11A:
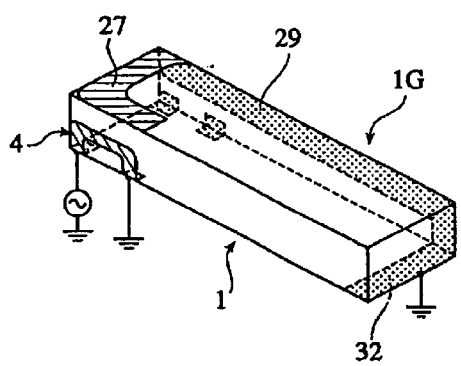
FIG. 11(a) is a perspective view showing a surface-mounted antenna according to the seventh embodiment of the present invention.
Figure 11B:
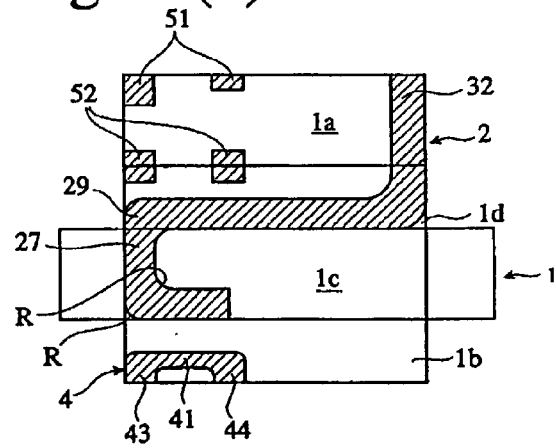
FIG. 11(b) is a development showing a surface-mounted antenna according to the seventh embodiment of the present invention.
Figure 12A:
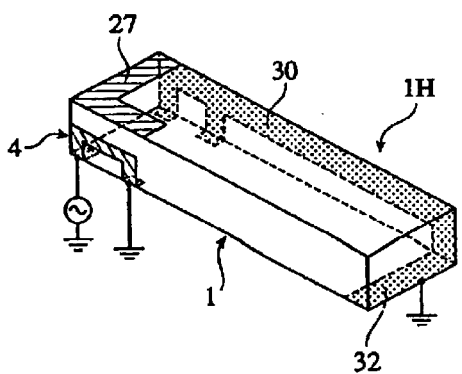
FIG. 12(a) is a perspective view showing a surface-mounted antenna according to the eighth embodiment of the present invention.
Figure 12B:
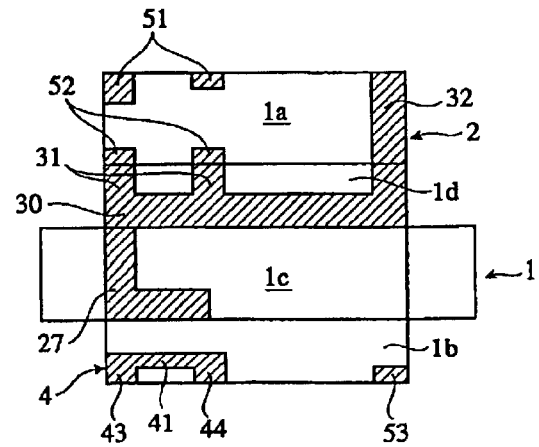
FIG. 12(b) is a development showing a surface-mounted antenna according to the eighth embodiment of the present invention.

FIGS. 10–12 show surface-mounted antennas according to the sixth to eighth embodiments of the present invention. The same symbols and reference numerals are assigned to the same portions as in the above embodiments, and thus their explanation will be omitted. In these embodiments, each ribbon-shaped radiation electrode 2 is formed on the substrate 1 from a side surface 1d to an upper surface 1c.

In the sixth embodiment shown in FIG. 10, an L-shaped electrode portion 27 is formed in an end portion of an upper surface 1c, and an L-shaped electrode 28 is continuously formed on an adjacent side surface 1d of the substrate 1. A current-feeding electrode 4 is in a portal shape having leg portions 43, 44 each having a current-feeding end and a grounding end, and a center portion 41 aligned with the radiation electrode, formed on the side surface 1b of the substrate 1 near an open tip end of the L-shaped electrode portion 27.

In the seventh embodiment shown in FIG. 11, an L-shaped electrode portion 27 is formed in an end portion of an upper surface 1c of the substrate 1, and an L-shaped electrode 29 is continuously formed on an adjacent side surface 1d. In the eighth embodiment shown in FIG. 12, an L-shaped electrode portion 27 is formed in an end portion of an upper surface 1c of the substrate 1, and an I-shaped electrode 30 is formed continuously on an adjacent side surface 1d. With respect to the shape of a current-feeding electrode 4, the seventh and eighth embodiments may be substantially the same as the sixth embodiment.

Electrodes 51 are those soldered for fixing an antenna to a circuit board, and the embodiments shown in FIGS. 11 and 12 comprise additional electrodes 52 soldered for increasing bonding strength to the circuit board. The electrodes 51, 52 are not connected to the ground conductor of the circuit board. In the embodiments shown in FIGS. 10–12, the radiation electrode is in an L shape to have increased inductance. In the embodiments shown in FIG. 11, each of the L-shaped radiation electrode portion 29 and the portal current-feeding electrode 4 has a rounded bent portion. A radius of curvature R may be given only to the radiation electrode. When the substrate 1 is provided with a low height, as shown in FIG. 12, the soldering electrode 52 may be connected directly to the radiation electrode 30 via a connecting electrode 31 to stabilize antenna characteristics without suffering from large variations.

When the L-shaped electrode portion 29 has a rounded bent portion R as shown in FIG. 11, radiation gain is improved. In a conventional radiation electrode having a bent portion substantially in a shape of L, rectangular U, meander or crank, its straight portion and its bent portion are different in width, connected in a rectangular manner. This means that impedance changes discontinuously, leading to the partial reflection of a propagating wave. Accordingly, there is large reflection loss in an input high-frequency signal, resulting in decrease in a gain. It has been found that when the bent portion is rounded to provide a line electrode with substantially the same width, it is possible to avoid the discontinuity of impedance. It has also been found that chamfering the bent portion is effective. If reflection loss in the bent portion were suppressed, transmission loss would be decreased in a resonance current flowing through the radiation electrode of the antenna, resulting in improvement in a gain.

Figure 13A:
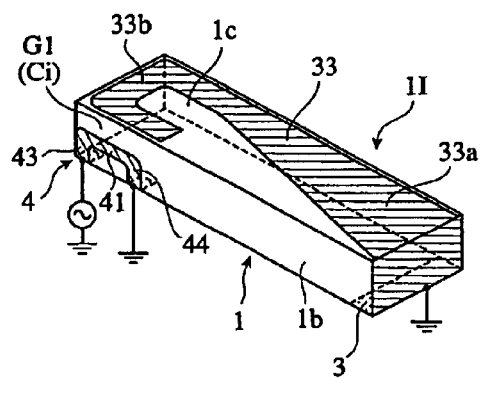
FIG. 13(a) is a perspective view showing a surface-mounted antenna according to the ninth embodiment of the present invention.
Figure 13B:
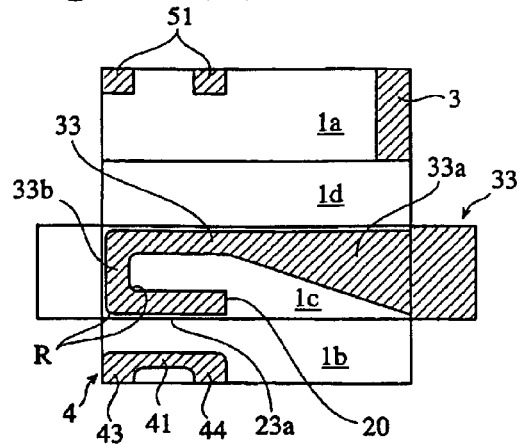
FIG. 13(b) is a development showing a surface-mounted antenna according to the ninth embodiment of the present invention.
Figure 14A:
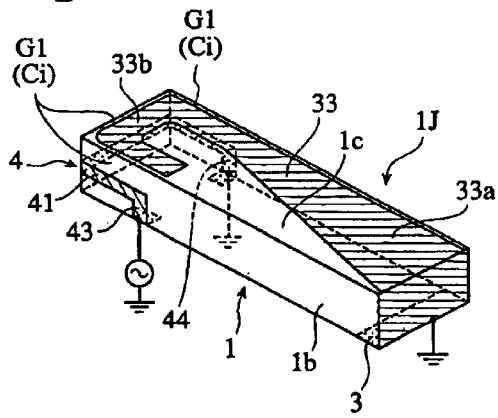
FIG. 14(a) is a perspective view showing a surface-mounted antenna according to the tenth embodiment of the present invention.
Figure 14B:
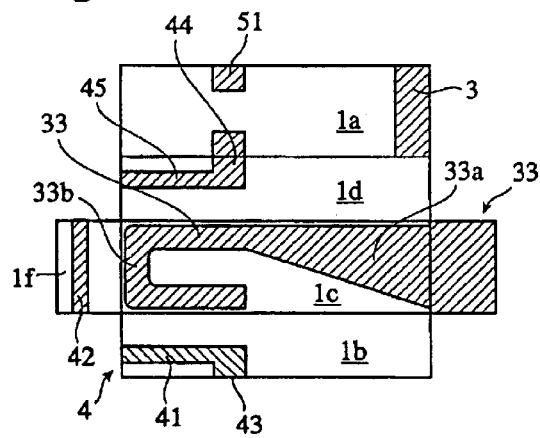
FIG. 14(b) is a development showing a surface-mounted antenna according to the tenth embodiment of the present invention.

FIGS. 13 and 14 show surface-mounted antennas according to the ninth and tenth embodiments of the present invention. The same symbols and reference numerals are assigned to the same portions as in the above embodiments, and thus their explanation will be omitted. These embodiments are characterized by a radiation electrode 33 and a current-feeding electrode 4. The radiation electrode 33 is formed mainly on an upper surface 1c of the substrate 1, and like the embodiment shown in FIG. 3, it is constituted by a radiation electrode portion 33a extending from one end connected to a grounding electrode 3 to the other end in a longitudinal direction with its width narrowing substantially continuously and/or stepwise, and a radiation electrode portion 33b that is bent in a left end portion in a shape of rectangular U or L. With such radiation electrode 33, wideband resonance characteristics can be obtained by the radiation electrode portion 33a in a trapezoidal shape, and inductance is supplemented by the bent radiation electrode portion 33b. Electrodes 51, which are soldered for fixing the antenna to the circuit board, are formed minimally.

There is a gap of about 0.2–0.5 mm between an outer periphery of the radiation electrode 33 and an edge of the substrate 1. With this gap, the printing of electrodes is made easy, making it less likely to cause the misalignment of printing. It also prevents the peeling of electrodes due to the deformation and cracking at edges of the substrate 1, etc. By preventing the misalignment and peeling of printed electrodes, it is possible to suppress the variations of propagating frequencies. The structure in which the radiation electrode 33 is formed only on an upper surface 1c of the substrate 1 is smaller in capacitance coupling to the ground conductor of the circuit board than the structure in which the radiation electrode 33 is formed also on a side surface, so that the former provides a higher gain.

As shown in FIG. 13, a portal current-feeding electrode 4 formed on the side surface 1b is opposing an open tip end 20 of the radiation electrode portion 33b. The current-feeding electrode 4 shown in FIG. 14 comprises an L-shaped electrode portion 41 having a current-feeding end 43 at one end and formed on the side surface 1b, an I-shaped electrode portion 42 formed on an end surface 1f, and an L-shaped electrode portion 45 having a grounding end 44 at one end and formed on the side surface 1d. The portal current-feeding electrode 4 comprises a rectangular U-shaped aligned portion 41 constituted by the electrode portions 41, 42, 45 formed on two side surfaces 1b, 1d and an end surface 1f, and the aligned portion 41 is opposing the rectangular U-shaped radiation electrode 33b. With such current-feeding electrode 4, capacitance coupling can be achieved in substantially the entire rectangular U-shaped portion of the radiation electrode 33, advantageous in the miniaturization of the antenna. Also, a wider gap can be provided between the current-feeding electrode 4 and the radiation electrode 33 to achieve the same capacitance, resulting in decrease in the variations of capacitance due to the misalignment of printing, etc. and the variations of propagation frequency.

Figure 15A:
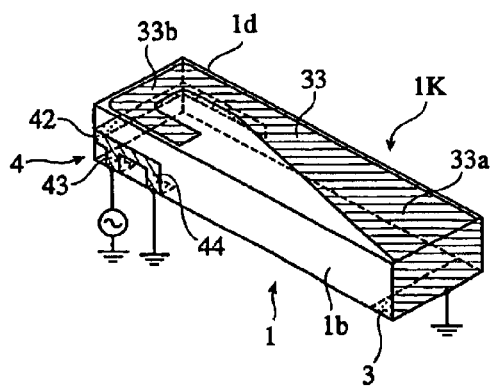
FIG. 15(a) is a perspective view showing a surface-mounted antenna according to the eleventh embodiment of the present invention.
Figure 15B:
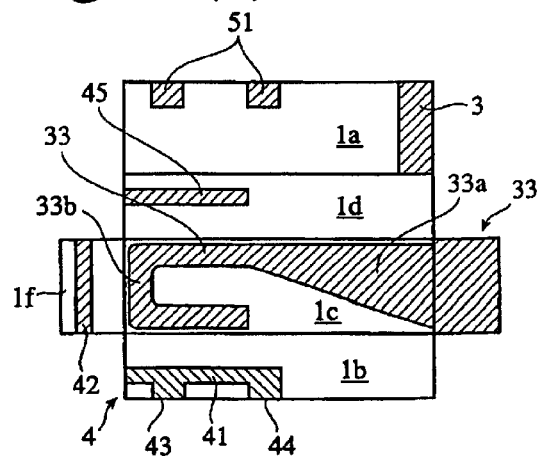
FIG. 15(b) is a development showing a surface-mounted antenna according to the eleventh embodiment of the present invention.

FIG. 15 shows a surface-mounted antenna according to the eleventh embodiment of the present invention. This embodiment differs from the other embodiments in the structure of the current-feeding electrode 4. That is, the current-feeding electrode 4 is constituted by an F-shaped electrode portion 41 formed on the side surface 1b of the substrate 1 and having a current-feeding end 43 and a grounding end 44, and straight electrode portions 42, 45 formed on the end surface 1f and the side surface 1d. The current-feeding electrode in this embodiment can achieve impedance matching and increase the bandwidth utilizing composite resonance.

Figure 16A:
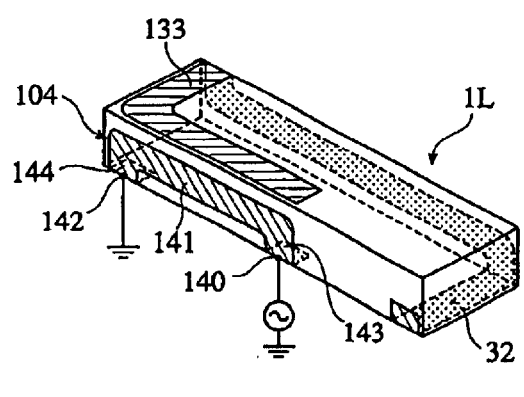
FIG. 16(a) is a perspective view showing a surface-mounted antenna according to the twelfth embodiment of the present invention.
Figure 16B:
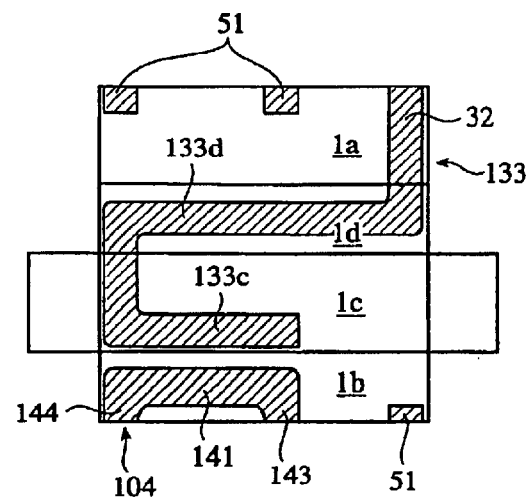
FIG. 16(b) is a development showing a surface-mounted antenna according to the twelfth embodiment of the present invention.

FIG. 16 shows a surface-mounted antenna according to the twelfth embodiment of the present invention. The ribbon-shaped radiation electrode 133 is constituted by a crank-shaped electrode portion 133d formed on the side surface 1d in a longitudinal direction, and an L-shaped electrode portion 133c formed on the upper surface 1c, thereby being in a portal shape as a whole. Because the radiation electrode 133 extends from an upper surface 1c of the substrate 1 to its side surface 1d in a bent manner, the entire radiation electrode 133 can be made longer. As a result, the antenna substrate 1 can be made smaller at the same bandwidth.

The positional relation of the current-feeding portion 143 and the grounding portion 144 of the current-feeding electrode 104 is opposite to that in the above embodiments, the current-feeding point 140 being positioned substantially at a center of the substrate, and the current-feeding portion 143 being positioned near the open tip end of the radiation electrode 133. Thus, when the L-shaped electrode portion 133c formed on the upper surface 1c is projected onto the bottom surface 1a, it does not overlap the grounding electrode 32. This arrangement provides well balanced antenna characteristics for GPS; improved bandwidth and good omni-directionality. The open tip end of the radiation electrode 133 is close to the aligned portion 141 of the current-feeding electrode 104. With the wide aligned portion 141, impedance matching can easily be achieved, resulting in slight improvement in a gain.

Though the aligned portion 141 is in a wide rectangular shape in this embodiment, the shape of the current-feeding electrode 104 may be variously changed depending on the position of the antenna mounted onto the circuit board, the arrangement of conductor patterns on the circuit board, the structure of the radiation electrode, etc. Even if the specifications of the circuit board and the radiation electrode 133 are changed, inductance and capacitance can properly be adjusted by properly setting the arrangement, shape, size, etc. of the current-feeding electrode 104 between the current-feeding point 140 and the grounding point 142, to easily achieve impedance matching.

Figure 17:
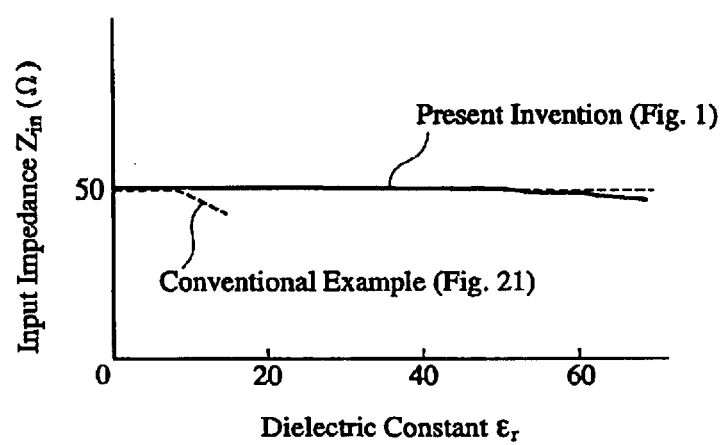
FIG. 17 is a graph showing the relation between the dielectric constant and the input impedance.
Figure 21:
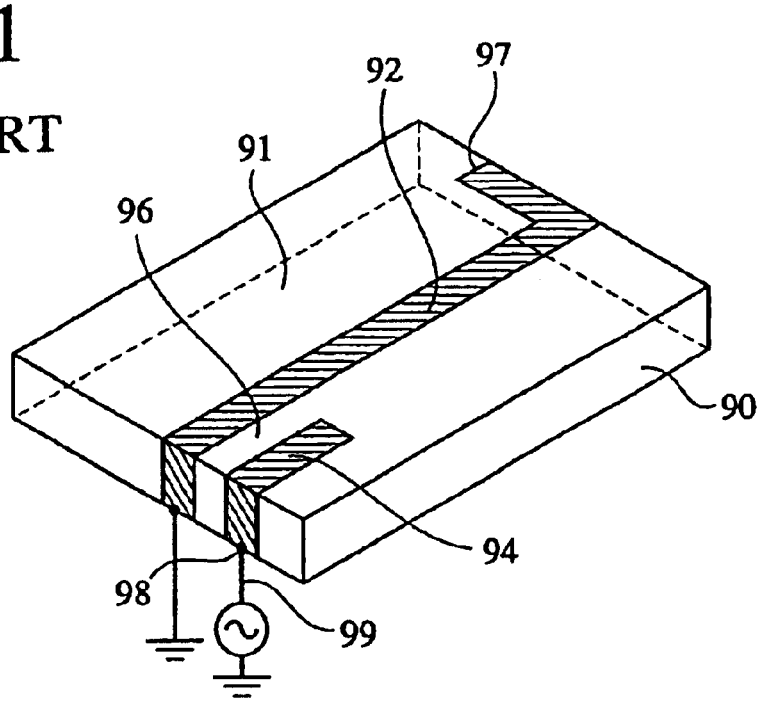
FIG. 21 is a perspective view showing one example of conventional surface-mounted antennas.
Figure 22:
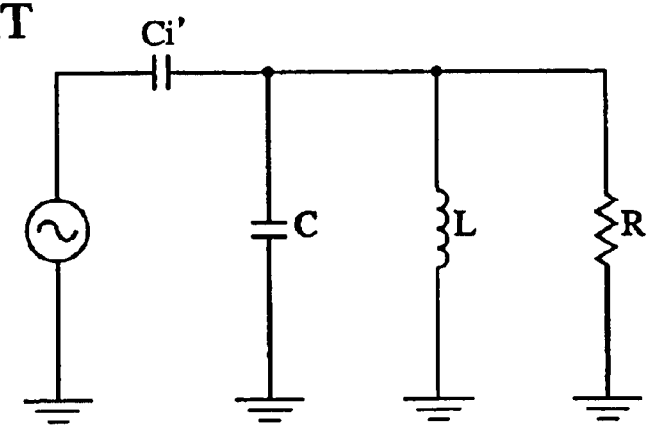
FIG. 22 is a view showing an equivalent circuit of the antenna of FIG. 21.

FIG. 17 shows the relations between input impedance $Z_{in}$ determined by simulation and the dielectric constant $\in_r$ of the substrate, with respect to the surface-mounted antenna (the present invention) of FIG. 1 and the surface-mounted antenna (conventional example) of FIG. 21. In the present invention, increase in capacitance due to the use of a high-dielectric constant substrate can properly be cancelled by inductance, thereby making it possible to use a high-dielectric material having a dielectric constant $\in_r$ of up to about 50. It is thus possible to use a dielectric material having a dielectric constant $\in_r$ 5 times or more of the $\in_r$ (about 4) of conventional dielectric materials, effect for the miniaturization of the antenna. Incidentally, if dielectric materials stable in a high-temperature region were developed, or if there were provided improved working techniques, the upper limit of input impedance $Z_{in}$ would be further increased. In addition, it is expected that if composite materials of high-dielectric constant materials and low-dielectric constant materials were developed, the upper limit would also be increased.

[6] Communications Apparatus

Figure 18:
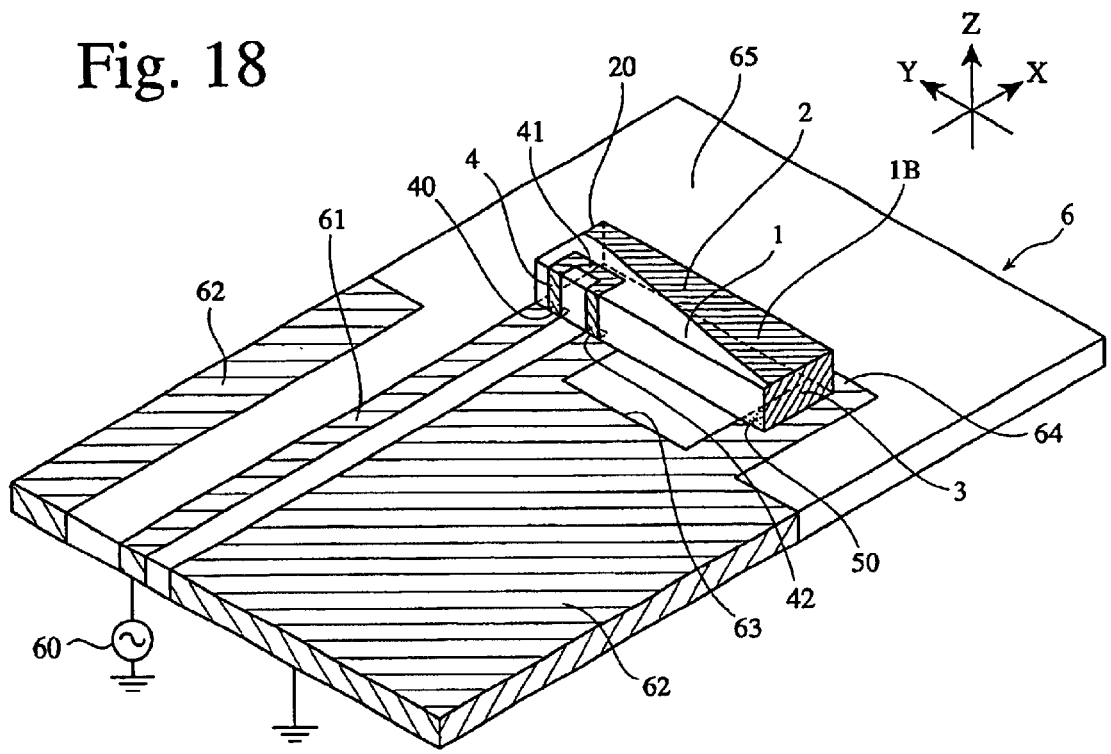
FIG. 18 is a perspective view showing the antenna of the present invention mounted onto a circuit board.

FIG. 18 shows the antenna 1B of FIG. 3 mounted onto a circuit board 6. Other parts than the antenna are omitted in FIG. 18. The antenna 1B is disposed on the circuit board 6 in an exposed area 65 free from a ground conductor, such that it is aligned with an edge of 63 of the ground conductor 62 in a longitudinal direction with a slight gap. In this case, the current-feeding electrode 4 is positioned on the side of the ground conductor 62, and the open tip end 20 of the radiation electrode 2 is located at a position far from the ground conductor 62. One end of the portal current-feeding electrode 4 is connected to a current-feeding wire 61, and the other end of the portal current-feeding electrode 4 is connected to the ground conductor 62. With this structure, a high-frequency signal supplied from a feed source 60 is sent to the current-feeding electrode 4 via the current-feeding wire 61, and signal current is divided to current flowing from the current-feeding end 40 via the aligned portion 41 toward the radiation electrode 2 and current flowing via the grounding end 42 toward the ground conductor 62, thereby achieving impedance matching and exciting the radiation electrode 2. As a result, electromagnetic waves are radiated toward the space from the open tip end 20 of the radiation electrode 2.

Most conventional antennas are arranged perpendicularly to an edge of the ground conductor 62. In this case, there is a large dead space on the circuit board, inevitably resulting in small freedom of design. In the present invention, however, the antenna is arranged on the circuit board in parallel with an edge of the ground conductor 62 slightly separate therefrom. As a result, an area (including a dead space) substantially occupied by the antenna is drastically reduced, resulting in increase in the freedom and density of mounting layout and thus decrease in space for the antenna apparatus.

The lateral arrangement of the current-feeding portion 43 and the grounding portion 44 of the current-feeding electrode 4 may be changed depending on the arrangement of the current-feeding wire 61 and the ground conductor 62 on the board 6, though it is necessary that at least the current-feeding electrode 4 is arranged on the side of the current-feeding wire 61, and that the ground conductor 62 and the antenna substrate 1 are in parallel with each other in a longitudinal direction, to obtain the effects of the present invention with a small occupied area. To be omni-directional, the antenna of the present invention is desirably mounted in an exposed area 65 free from the ground conductor 62.

Figure 19:
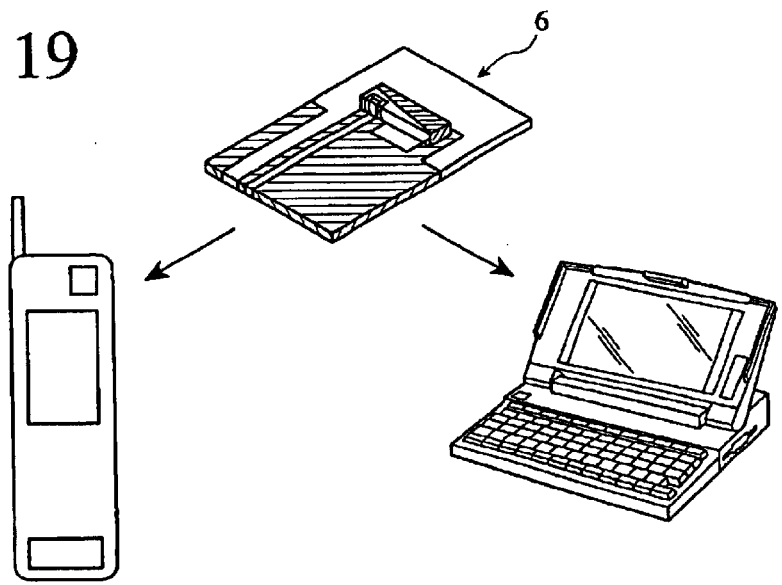
FIG. 19 is a schematic view showing a communications apparatus comprising the antenna of the present invention.

With the antenna thus mounted onto the circuit board 6 assembled in a cell phone, a personal computer, etc. schematically shown in FIG. 19, it can be utilized as a communications apparatus equipped with the functions of GPS and wireless LAN.

FIG. 20 shows an example in which the antenna shown in FIG. 16 is mounted onto a circuit board 6 different from that shown in FIG. 18. The same reference numerals are assigned to the same portions as in FIG. 18. The antenna 1L is disposed on an exposed area 65 of the circuit board 6 free from a ground conductor 62, such that the antenna substrate 1 is in alignment with an edge of 63 of the ground conductor 62 with a slight gap.

The current-feeding electrode 4 is formed on the side surface 1b of the substrate 1 on the side of the ground conductor 62, with the current-feeding end 140 of the current-feeding electrode 104 connected to the current-feeding wire 61, and the grounding end 142 connected to the ground conductor 62. A portion of a grounding electrode 32 connected to the radiation electrode 133, which is positioned near a corner of the circuit board 6, is connected to the ground conductor 62 of the circuit board 6 via a linear electrode 66. The linear electrode 66 functions as inductance, making it easy to miniaturize the antenna substrate 1. For the same substrate 1, a bandwidth can be expanded using a lower-dielectric constant material. Metal areas 51', 53' are provided to fix the antenna substrate 1 to the circuit board 6 by soldering.

Figure 23:
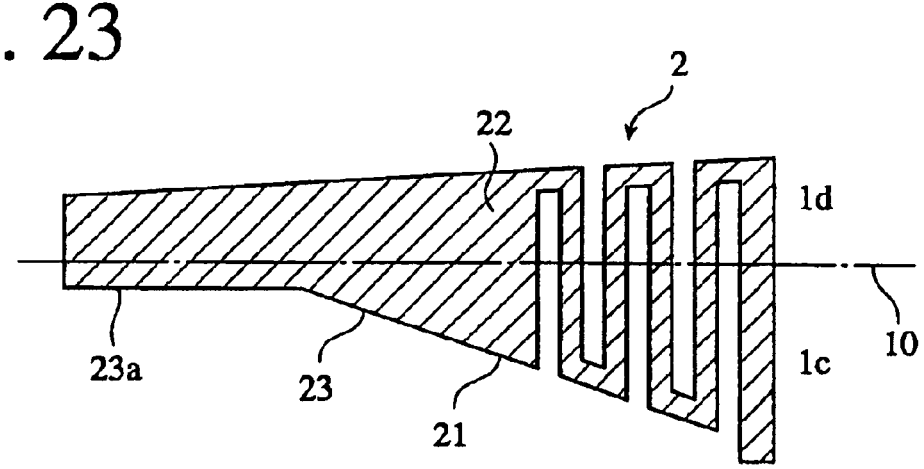
FIG. 23 is a development showing a radiation electrode in the surface-mounted antenna of Comparative Example 1.

With respect to Example 2 shown in FIG. 3, Example 7 shown in FIG. 11 and Example 12 shown in FIG. 16, the characteristics of these antennas were tested. Also, the same antenna as shown in FIG. 3 except that part of the radiation electrode 2 is formed in a meandering shape as shown in FIG. 23 was used as Comparative Example 1, to test the characteristics of the antenna. An antenna substrate was formed by a dielectric ceramic having a dielectric constant $\in_r$ of 21. The size of the substrate was 15 mm in length×3 mm in width×3 mm in thickness in Example 2 and Comparative Example 1, and 10 mm in length×3 mm in width×2 mm in thickness in Examples 7 and 12. With a propagation frequency having a center frequency of 1.575 GHz±1 MHz, a bandwidth BW (MHz), an average gain (dBi) and directionality were measured at a voltage standing wave ratio (VSWR) of 2.

With the current-feeding terminal formed in one end portion of the antenna-mounted board connected to an input terminal of the network analyzer via a coaxial cable (characteristic impedance: 50 Ω), a scattering parameter of the antenna at the current-feeding terminal viewed from a network analyzer was measured. The VSWR was calculated from the resultant measurement values. The gain was measured by connecting a signal generator to a current-feeding terminal of an antenna to be tested (transmission side) in an anechoic chamber, and receiving electric power emitted from the antenna to be tested by a receiving reference antenna. The gain Ga of the antenna to be tested is expressed by Ga=Gr×Pa/Pr, wherein Pa is a electric power received from the antenna to be tested, and Pr is a received electric power measured by a transmitting reference antenna having a known gain Gr. With respect to directionality, the antenna to be tested is placed on a rotatable table and rotated around X, Y and Z axes, respectively, as shown in FIG. 18, to measure a gain at each rotation angle. In addition, considering that an antenna is mounted onto a communications apparatus such as a cell phone, etc. as shown in FIG. 19, the metal dependency of characteristics of the antenna was examined. The measurement results are shown in Table 1.

TABLE 1

| No. | FIG. | Bandwidth (MHz) | Average Gain (dBi) | Dependency on Metal |
|---|---|---|---|---|
| Example 2 | 3 | 40 | −4.5 | Small (Stable, High Gain) |
| Example 7 | 11 | 35 | −5.5 | Small (Stable, High Gain) |
| Example 12 | 16 | 45 | −4.5 | Small (Stable, High Gain) |
| Comparative Example 1 | 23 | 45 | −6.0 | Large (rapidly deteriorated when metal neared) |

It is clear from the above results that the antenna of Examples 2, 7 and 12 are easy to achieve impedance matching despite their substrate of a relatively high dielectric constant. Though the antennas of Examples 2 and 7 were slightly narrower in bandwidth than that of Comparative Example 1, they had high radiation gain and stable characteristics, suffering from only small decrease in gain when a metal neared. The antennas of Examples 7 and 12 had good bandwidth and gain, though the substrate size was as small as about ⅔. With respect to omni-directionality, three of them had gain substantially close to a circle in three axes, indicating that they were free from directionality and thus had omni-directional characteristics. It is clear from the above that the antennas of Examples 2, 7 and 12, particularly that of Example 12, had a well balanced combination of bandwidth, radiation gain, directionality and metal dependency. Why the antenna of Comparative Example 1 had a low radiation gain appears to be due to the fact that because of difficulty of impedance matching, the radiation electrode is in a meandering shape to increase matching inductance.

It is clear from the above that by utilizing a radiation electrode having a shape shown in FIGS. 10–16, the antenna can be made as small as about 10 mm or less in length, about 3 mm or less in width and about 2 mm or less in thickness.

The shape of the antenna substrate is not restricted to a rectangular solid but may be in any proper shape, and a magnetic body, a resin body or these laminate may be used. Also, to expand the bandwidth and to adjust the frequency, it is effective to trim the aligned portion 23a or the substrate 1 near a tip end of the radiation electrode 2.

Though the radiation electrode may be in various shapes such as a trapezoidal shape, a stepped shape, a curved shape, a meandering shape, a partially meandering shape, a crank shape, etc., it is desirable that the radiation electrode has a shape extending with its width narrowing substantially continuously and/or stepwise in a longitudinal direction. One end of the radiation electrode is not necessarily connected to the grounding electrode continuously, but discontinuous capacitance coupling may be used.

When the antenna of the present invention is mounted onto an area of the circuit board free from a ground conductor, the maximum characteristics are expected, though it may be mounted onto a ground conductor with its characteristics sacrificed to some extent. The antenna structures of the above embodiments may be combined, and various modifications may be made within the scope of the present invention.

As described above, according to the present invention, impedance matching is easy particularly when a high-dielectric constant material is used for the substrate, providing a small, light-in-weight, high-gain, wide-band, omni-directional, surface-mounted antenna. Used for GPS, wireless LAN, etc., the surface-mounted antenna of the present invention antenna functions as a communications apparatus fully exhibiting its characteristics.

What is claimed is:

1. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;
    said current-feeding electrode having a current-feeding point at one end and a grounding point at the other end, as well as a portion for achieving impedance matching by capacitance and inductance between said current-feeding point and said grounding point; and
    an area ratio of said grounding electrode in a bottom surface of said substrate being 30% or less.

2. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;
    said current-feeding electrode being constituted by two L-shaped electrodes formed on the opposing side surfaces of said substrate, which are connected via one I-shaped electrode formed on an end surface of said substrate;
    one L-shaped electrode having a current-feeding portion at one end;
    the other L-shaped electrode having a grounding portion at one end; and
    said I-shaped electrode being a portion in alignment with said radiation electrode, whereby said current-feeding electrode is in a portal shape.

3. The surface-mounted antenna according to claim 2, wherein said current-feeding electrode is constituted by first and second electrodes formed on the opposing side surfaces of said substrate, which is connected via one I-shaped electrode formed on an end surface of said substrate;
    the first electrode having a current-feeding portion at one end, the second electrode having a grounding portion at one end, and said I-shaped electrode being said aligning portion, so that said current-feeding electrode is in a portal shape; and
    said radiation electrode having a grounding electrode portion formed on an end surface, or on an end surface and opposing side surfaces, of said substrate.

4. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;
    said current-feeding electrode being in a portal shape having a current-feeding portion at one end and a grounding portion at the other end, as well as a portion in alignment with said radiation electrode via a gap between said radiation electrode and said current-feeding electrode, wherein an area ratio of said grounding electrode in a bottom surface of said substrate is 30% or less.

5. The surface-mounted antenna according to claim 4, wherein at least part of said current-feeding electrode is in a shape of a meander, rectangular U, L or a crank.

6. The surface-mounted antenna according to claim 4, wherein said current-feeding electrode is formed on a side surface of said substrate such that it faces an open tip end of said radiation electrode with a gap.

7. The surface-mounted antenna according to claim 4, wherein said current-feeding electrode has a current-feeding portion positioned near an open tip end of said radiation electrode.

8. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;

said current-feeding electrode being in a portal shape having a current-feeding portion at one end and a grounding portion at the other end, as well as a portion in alignment with said radiation electrode via a gap between said radiation electrode and said current-feeding electrode, wherein at least part of said radiation electrode extends from one end of said substrate toward the other end thereof in a longitudinal direction with its width narrowing substantially continuously and/or stepwise.

9. The surface-mounted antenna according to claim 4, wherein said radiation electrode extends to an upper surface through a side surface different from a side surface on which said current-feeding electrode is formed.

10. The surface-mounted antenna according to claim 4, wherein the bottom surface of said substrate has substantially no grounding electrode in at least an area under a tip end portion of said radiation electrode formed on an upper surface of said substrate.

11. The surface-mounted antenna according to claim 4, wherein said radiation electrode has a bent portion in a shape of a meander, rectangular U, L or a crank.

12. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;

said current-feeding electrode being in a portal shape having a current-feeding portion at one end and a grounding portion at the other end, as well as a portion in alignment with said radiation electrode via a gap between said radiation electrode and said current-feeding electrode, wherein said radiation electrode has a bent portion and the bent portion itself is in a shape of a meander, rectangular U, L or a crank, and wherein said radiation electrode and/or said current-feeding electrode has round corners.

13. A surface-mounted antenna comprising a substrate made of a dielectric or magnetic material, a radiation electrode formed on at least an upper surface of said substrate, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;

said current-feeding electrode being in a portal shape having a current-feeding portion at one end and a grounding portion at the other end, as well as a portion in alignment with said radiation electrode via a gap between said radiation electrode and said current-feeding electrode, wherein said antenna further comprises a second grounding electrode opposing the other end of said radiation electrode via a gap.

14. A surface-mounted antenna comprising a substrate made of a dielectric or magnetic material, a ribbon-shaped radiation electrode formed on said substrate, a grounding electrode formed on said substrate such that said grounding electrode is directly connected or capacitance-coupled to one end of said radiation electrode, and a current-feeding electrode formed on at least a side surface of said substrate separate from said radiation electrode with a desired gap;

said radiation electrode being in a portal shape as a whole comprising an electrode portion formed on one side surface of said substrate in a longitudinal direction, which is connected to an L-shaped electrode portion formed on an upper surface of said substrate;

said current-feeding electrode comprising a current-feeding portion and a grounding portion each extending substantially vertically on the other side surface of said substrate, and an aligned portion extending between said current-feeding portion and said grounding portion substantially in parallel with said radiation electrode via said gap;

an area ratio of said grounding electrode in a bottom surface of said substrate being 30% or less; and the shape and positional relation of said current-feeding electrode and said radiation electrode being modified to adjust capacitance and inductance for impedance matching.

15. The surface-mounted antenna according to claim 14, wherein said current-feeding portion of said current-feeding electrode is positioned near an open tip end of said radiation electrode, while said grounding portion of said current-feeding electrode is positioned near a substrate end on the opposite side to said grounding electrode.

16. A communications apparatus comprising an antenna apparatus having a surface-mounted antenna comprising a substrate made of a dielectric or magnetic material, a radiation electrode formed on at least an upper surface of said substrate in a longitudinal direction, a grounding electrode formed on said substrate such that said grounding electrode is directly connected or capacitance-coupled to one end of said radiation electrode, and a current-feeding electrode formed on at least a side surface of said substrate such that said current-feeding electrode faces said radiation electrode via a gap;

said current-feeding electrode being in a portal shape having a current-feeding portion at one end and a grounding portion at the other end, as well as a portion in alignment with said radiation electrode via a gap between said radiation electrode and said current-feeding electrode;

said surface-mounted antenna being mounted onto a circuit board; and said surface-mounted antenna being mounted onto an area of said circuit board free from a ground conductor, such that said substrate is aligned in a longitudinal direction with an edge of said ground conductor with a gap, and that said current-feeding electrode is positioned on the side of said ground conductor.

17. The communications apparatus according to claim 16, wherein said grounding electrode formed on said substrate on the opposite side of said ground conductor of said circuit board is arranged near a corner of said circuit board, and said grounding electrode is connected to a conductor of said circuit board by a linear conductor.

* * * * *